(12) United States Patent
Moore

(10) Patent No.: US 8,478,110 B2
(45) Date of Patent: Jul. 2, 2013

(54) RECORDING INTERACTIVE SERVICES

(75) Inventor: Nigel Stuart Moore, Newbury (GB)

(73) Assignee: Sony United Kingdom Limited, Weybridge (GB)

( * ) Notice: Subject to any disclaimer, the term of this patent is extended or adjusted under 35 U.S.C. 154(b) by 755 days.

(21) Appl. No.: 12/544,301

(22) Filed: Aug. 20, 2009

(65) Prior Publication Data

US 2010/0067868 A1 Mar. 18, 2010

(30) Foreign Application Priority Data

Sep. 18, 2008 (GB) .................................. 0817145.6

(51) Int. Cl.
*H04N 9/88* (2006.01)
(52) U.S. Cl.
USPC .................................... 386/271; 386/E5.003
(58) Field of Classification Search
USPC ............................................ 386/271, E5.003
See application file for complete search history.

(56) References Cited

U.S. PATENT DOCUMENTS

| | | | |
|---|---|---|---|
| 7,000,245 B1 * | 2/2006 | Pierre et al. ..................... | 725/136 |
| 2001/0037507 A1 * | 11/2001 | Mori ................................ | 725/97 |
| 2002/0170074 A1 | 11/2002 | Houldsworth et al. | |
| 2003/0163832 A1 | 8/2003 | Tsuria et al. | |
| 2004/0028388 A1 | 2/2004 | Kataoka et al. | |
| 2006/0117338 A1 | 6/2006 | Mori | |
| 2006/0212915 A1 | 9/2006 | Kelly et al. | |
| 2008/0098444 A1 * | 4/2008 | Shikata et al. ................. | 725/110 |
| 2009/0199231 A1 | 8/2009 | Tsuria et al. | |

FOREIGN PATENT DOCUMENTS

| | | |
|---|---|---|
| EP | 1 304 877 A1 | 4/2003 |
| WO | WO 02/01866 A2 | 1/2002 |

OTHER PUBLICATIONS

Extended European Search Report issued Feb. 16, 2011, in Application No. / Patent No. 09251920.6-2202/2166746.

* cited by examiner

*Primary Examiner* — Thai Tran
*Assistant Examiner* — Girumsew Wendmagegn
(74) *Attorney, Agent, or Firm* — Oblon, Spivak, McClelland, Maier & Neustadt, L.L.P.

(57) ABSTRACT

A digital television recorder to record television programs, having a recording section to record data onto a storage medium, a filter to identify from a received transport stream, data of a television program for recording, a timer to be set with a time and, at that time, to start the recording onto the storage medium, data of the television program received from the filter, and a cache to store data of the interactive services associated with the television programs and provided in the respective transport streams. The filter identifies data of interactive services associated with the television programs, the timer starts, at a predetermined interval before the time, acquisition of the data of interactive services and storing acquired data of interactive services in the cache, and the recording section records, immediately prior to starting recording the data of the television program, the content of the cache to the storage medium.

13 Claims, 5 Drawing Sheets

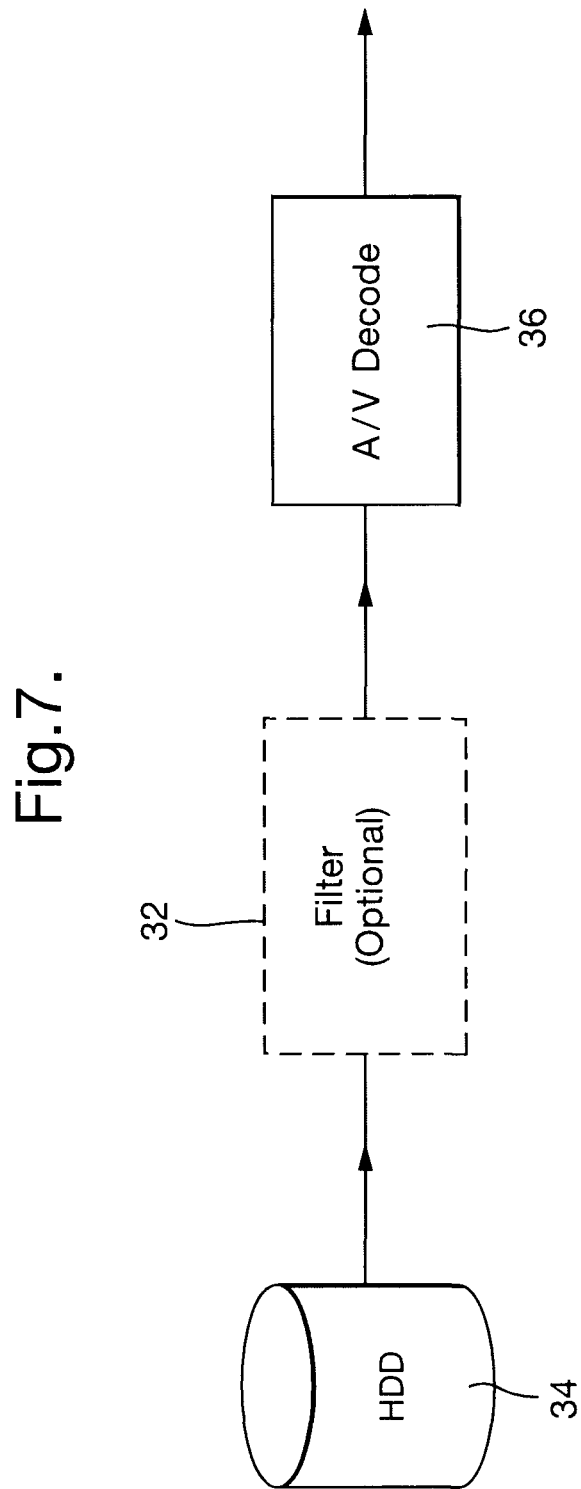

RECORDING INTERACTIVE SERVICES

CROSS-REFERENCE TO RELATED APPLICATIONS

This application is based upon and claims the benefit of priority from British Application No. 0817145.6 filed 18 Sep. 2008, the entire contents of which are incorporated by reference.

BACKGROUND OF THE INVENTION

1. Field of the Invention

The present invention relates to a television recorder, more particularly a digital television recorder, and a method for recording interactive services together with the television programs to which they relate.

2. Description of the Related Art

With the development of digital television broadcast, it has become possible to provide interactive services, for instance making use of the Multimedia Home Platform (MHP).

Interactive television content, such as MHP, can transmit applications relating to a television program in the same transport stream as the television program, for instance inside modules through a Digital Storage Media Command and Control (DSMCC) object carousel. The DSMCC modules are transmitted in the same transport stream as audio/video content. The source DSMCC data/object carousel can define how and when to send the module/files in the transport stream. The files are repeatedly sent over time and a digital television receiver merely awaits the file it requires as the carousel proceeds.

It is well known to provide a television recorder for recording television programs onto a storage medium, such as a hard drive, disc or tape. In this respect, it is also known to record with the television recorder exactly the audio/visual experience of the user during original reproduction of the television program. In other words, if the user accesses and makes use of an interactive service during the original live broadcast of a television program, those features accessed and used by the user and as presented to the user will be recorded for subsequent reproduction. The recorded information is thus no longer interactive.

Various proposals have been made with regard to recording interactive services.

US 2006/0212915 discusses the possibility of extracting interactive television modules/files from the original transport stream and storing them outside the transport stream in separate files. US 2002/0170074 proposes extracting and storing only parts of a carousel that are required by a particular application. U.S. Pat. No. 7,000,245 proposes storing data objects, accompanying object properties and a file table in a storage device.

These earlier proposals suffer from the problem that, during recording of a broadcast television program, not all of the corresponding interactive service may have become available such that the recorded interactive service will be incomplete. In the case of US 2002/0170074, it is indeed intended to record only parts of the available services. Also, these earlier proposals require separate storage of the interactive service data and, hence, non-standard processing for any reproduction device.

OBJECTS AND SUMMARY OF THE INVENTION

The present invention includes a recognition of the desirability to record with a television program all of the associated interactive services and to record those interactive services in a transport stream with the television program such that they can be accessed and received by a reproducing television device in a relatively conventional manner. The present invention also recognises the problem that, by merely recording the interactive service data as it is received contemporaneously with the television program data, a complete interactive service may not be available until after an undesirable playback time of the previously recorded television program. This seems particularly undesirable when all of the interactive service data will be present as part of the total recorded data.

According to the present invention, there is provided a method of recording to a storage medium, together with a time recording of a broadcast television program including an audio/video sequence, an interactive service associated with the television program and broadcast in a transport stream with a television program. The method includes, at a predetermined interval before start of the time recording of the television program, starting acquisition of data of the interactive service from the transport stream and storing acquired data of the interactive service in a cache and, immediately prior to starting recording of the television program to the storage medium, recording the content of the cache to the storage medium.

According to the present invention, there is provided a digital television recorder for recording television programs including audio/video sequences. The recorder includes a recording section configured to record data onto a storage medium, a filter configured to identify from within a received transport stream, data of a television program for recording, a timer configured to be set with a time and, at that time, to start the recording section recording, onto the storage medium, data of the television program received from the filter, and a cache configured to store data of the interactive services associated with television programs and provided in the respective transport streams of those television programs. The filter is configured additionally to identify, from within said received transport stream, data of interactive services associated with said television program. The timer is configured additionally to start, at a predetermined interval before said time, acquisition by the filter of said data of interactive services and storage of acquired data of interactive services in said cache. The recording section is additionally configured to record, immediately prior to starting recording the data of the television program, the content of the cache to the storage medium.

According to the present invention there is provided a method of controlling a digital television recorder for recording television programs including audio/video sequences. The method includes controlling a recording section of the recorder to record data onto a storage medium, controlling a filter of the recorder to identify from within a received transport stream data of a television program for recording, controlling the recording section to start, at a time set to a timer of the recorder, recording, onto the storage medium, data of the television program received from the filter, controlling the filter to identify, from within the received transport stream, data of interactive services associated with the television program, controlling, at a predetermined interval before said time, the filter to start acquiring said data of interactive services and a cache of the recorder to store the acquired data of interactive services, and controlling the recording section to record, immediately prior to starting recording the data of the television program, the content of the cache to the storage medium.

It is quite normal when making a timed recording of a broadcast television program to "wake-up" the recording device a short time, for instance 10 minutes, before the actual recording of the television program is due to start. Typically, as part of this "wake-up", the television device will check available data to see if the broadcast time of the required television program has been moved to an earlier time. By virtue of the present invention, it becomes possible to make use of the "wake-up" time to acquire from the broadcast transport stream and store locally in cache the interactive service data for the television program to be recorded. The data stored in the cache can then be recorded on the storage medium immediately prior to the television program such that, during reproduction, the reproducing television device retrieves the interactive service data from the same stream as the television program data without the need for any special storage or reproduction. It also has available to it all of that previously cached data immediately at the start of the reproduction of the television program and without needing to wait for any playback time.

Preferably, the filter is configured to identify interactive services provided as carousels and, during the predetermined interval, at least a substantial part of the carousel is stored in the cache.

Thus, the filter can operate in any known manner to acquire and store in cache data of a carousel present in a transport stream. It is expected that the predetermined interval is chosen to be sufficiently long that the entire carousel will have rotated during the interval such that all of the data of all interactive services will be stored in the cache in time to be transferred and recorded on the storage medium prior to the time of the start of recording of the television program. However, even if only part of the carousel is stored in the cache, there is still an advantage in that a shorter amount of playback time will be needed during reproduction in order to acquire all of the remaining data of all of the interactive services.

In this respect, preferably, the recording section is configured to, after being started by the timer at the time, record onto the storage medium data, received from the filter, of interactive services associated with the television program as well as data, received from the filter, of the television program.

By virtue of this preferred feature, even if all of the data of all of the interactive services are stored in the cache and, hence, recorded in the storage medium prior to the start of recording the television program, any updates or changes to the interactive services during the playback time of the recorded television program will be acquired by the reproducing device in the same manner as would have occurred during live reproduction.

Preferably, the filter is configured to identify interactive services provided in a transport stream inside modules of a DSM-CC object carousel. The filter may be used to identify any appropriate interactive services, such as MHEG.

Preferably, the recording section is configured to record onto the storage medium at said time a marker signifying the start of the data of the television program.

It may be possible for the interactive service data of the cache to be injected into the recording onto the storage medium at a very high bit rate immediately prior to recording television programs such that the duration of this insertion is very short and does not interfere significantly with start of playback of the television program. However, by providing the marker as noted above, a fake entry point can be provided for the reproduction device such that playback of the previously recorded television program can be started immediately at the marker or fake entry point.

Preferably, a parser can be provided for identifying, within the data of the interactive service associated with the television program, references to supplementary streams of data. These supplementary streams of data could include other television programs provided in the transport stream of the television program.

The recording section is preferably configured additionally to record the data of the referenced supplementary streams together with the data of the television program.

Not all interactive services are fully contained within the data of the service itself, for instance within its carousel. In some instances, the interactive service may reference stream components from other services, for instance other television programs which are broadcast simultaneously in the same transport stream. By identifying these streams with the parser, it becomes possible to record automatically the streams simultaneously with the main television program being broadcast. In this way, at any time during playback of the recorded main television program, an interactive service can be used, just as it would have been used during the original live broadcast, to switch to or access the audio/video stream of a television program that was simultaneously broadcast. In particular, the data recorded on the storage medium would include both the data for the main television program and also the television programs to which the interactive service might wish access.

Of course, this advantageous feature of the method and device can also be used without the feature of storing to cache the interactive service data prior to start of recording.

Preferably, the recording section is configured to start recording the content of the cache to the storage medium at a predetermined period before said time.

It may be established, given the size of the cache, that any interactive service data stored in the cache can be transferred and recorded to the storage medium within a known predetermined period. It then becomes sufficient merely always to start the recording of the content of the cache within that period.

On the other hand, it is also possible for the recorder to calculate the time required to record the content of the cache to the storage medium and, hence, start transfer and recording accordingly. Thus, alternatively, the recording section can be configured to, according to the quantity of data stored in the cache and the recording speed of the recording section recording the content of the cache to the recording medium, start recording the content of the cache to the storage medium sufficiently in advance of said time to ensure recording of the entire content of the cache before said time.

Preferably, the recording section is configured additionally to record onto the storage medium content information indicating the presence of the data of interactive services immediately prior to the data of the television program and for use in one or both of (1) warning a user and (2) preventing deletion of the data of interactive services during an editing operation of the data stored on the storage medium.

Having recorded an entire television program, a user may decide to edit that recorded television program, for instance by deleting the first part of the television program. Because, according to the present invention, the interactive service data is stored along with the television program data immediately before the television program data, deleting the first part of the stored data could inadvertently delete the interactive service data. According to this preferred feature, a user can be prevented from deleting the interactive service data or at least warned prior to deleting it.

According to the present invention, there may be provided a television reproducing device which is configured to warn a user and/or prevent deletion of the data of interactive services by making use of the content information.

According to the present invention, there may also be provided a digital television receiver including one or both of the recorder and reproducing device.

It will be appreciated that the present invention can also be embodied in software by means of a computer program comprising program code means for performing all of the steps of the invention and also a computer program product comprising program code means stored on a computer readable medium. The program code means may be provided in a form suitable for transmission to a digital television recorder for loading onto the digital television recorder so that that digital television recorder operates as explained above.

BRIEF DESCRIPTION OF THE DRAWINGS

FIGS. 6 and 7 illustrate schematically component parts of a system embodying the present invention and including playback functionality.

DETAILED DESCRIPTION OF THE PREFERRED EMBODIMENTS

The invention will be more clearly understood from the following description, given by way of example only, with reference to the accompanying drawings.

Figure 1:
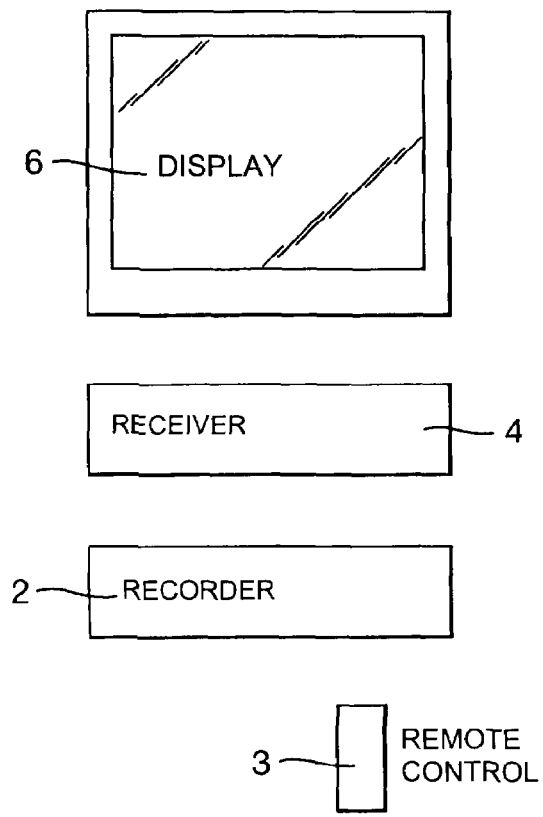
FIGS. 1, 2 and 3 illustrate various configurations including a television recorder embodying the present invention.

The present invention may be embodied in a television recorder such as the television recorder 2 illustrated in FIG. 1 for use with a television receiver 4 and television display device 6. The television recorder 2 may be a digital video recorder for recording television programs having audio/video sequences onto a storage medium, such as disc, tape or hard drive.

Figure 2:
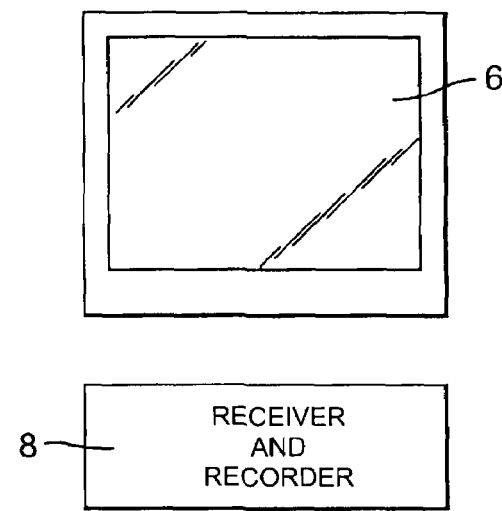

FIG. 2 illustrates an embodiment where the video recorder is combined with receiving and demodulating parts as a combined digital television receiver/recorder 8 for use with the digital television display 6. For example, the combined television receiver/recorder may take the form of a personal video recorder (PVR).

Figure 3:
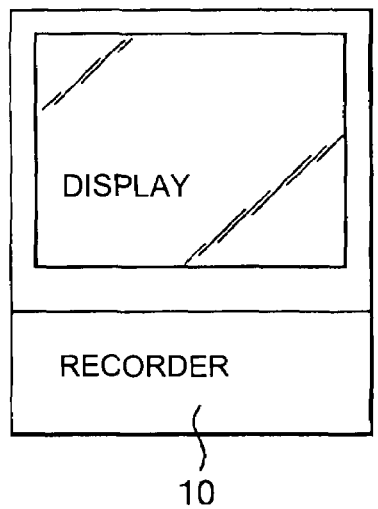

As illustrated in FIG. 3, the television recorder could similarly be integrated in an integrated television device 10.

Figure 4:
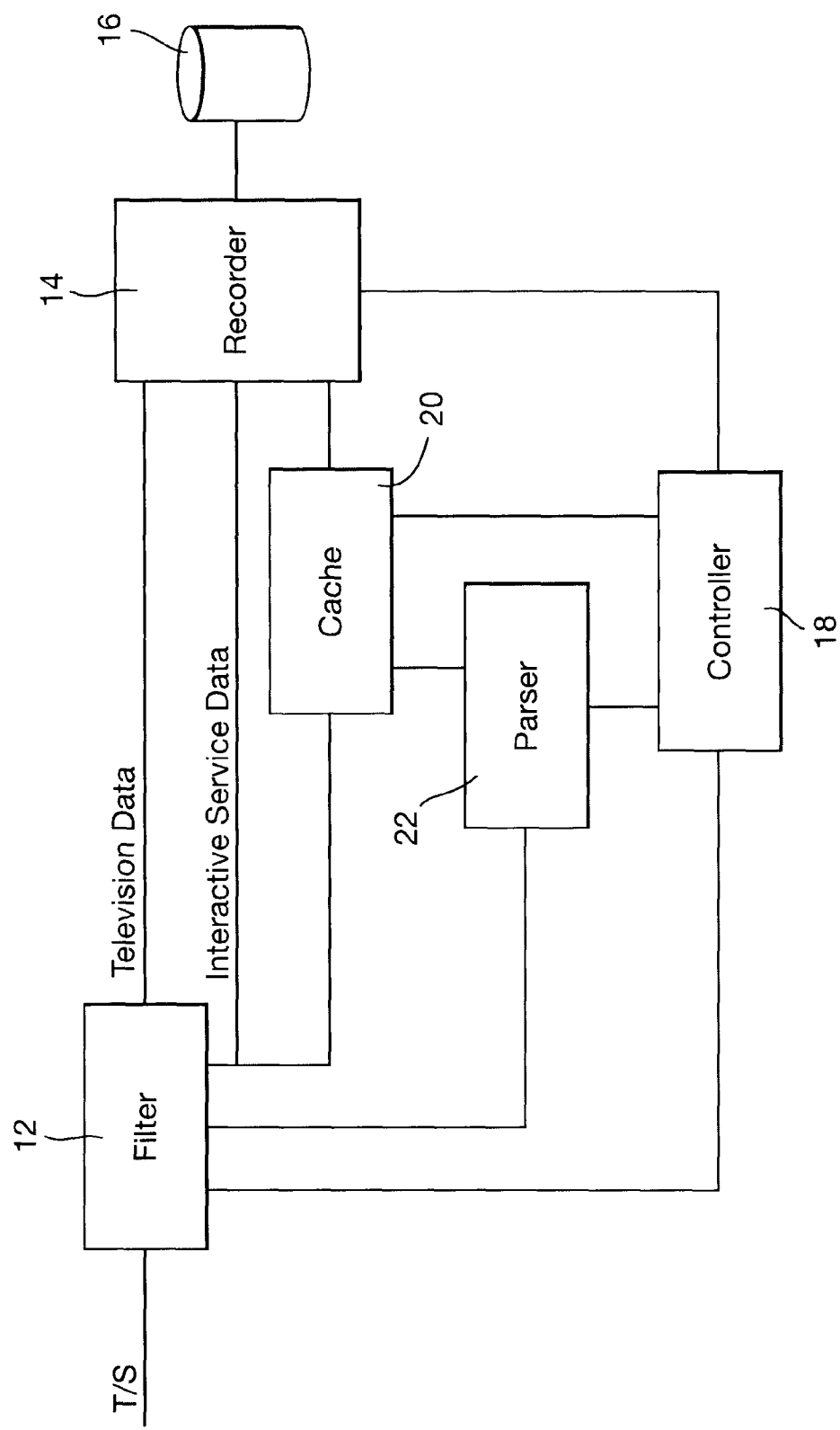
FIG. 4 illustrates schematically component parts of a television recorder embodying the present invention.

FIG. 4 illustrates schematically component parts of a television recorder embodying the present invention. In this respect, it should be appreciated that the functions of these parts could alternatively be embodied in software.

A transport stream TS is received by a filter 12. The transport stream may be of any known format, for instance using MPEG packets, and provided from any appropriate source, for instance having been broadcast over a DVB broadcast system or such like. In this respect, it will be appreciated that broadcast systems simultaneously broadcast a plurality of transport streams, each transport stream including time multiplexed data relating to different respective broadcast channels or television programs and interactive services.

The filter 12 may be provided with only one transport stream, namely that containing the television program for recording, or a plurality of transport streams.

The filter 12 is configured to identify, for instance from a packet identifier (PID), which packets of data received in the transport stream relate to a television program to be recorded. The packets of data identified in this way are then transferred to a recorder 14 for recording on a storage medium 16, such as a disc, tape or hard drive. The packets of data relating to the television program in question can be recorded in their original form as a stream on the storage medium 16 for subsequent retrieval and assembly by a reproduction device.

A timer is provided, for instance as part of a controller 18 for initiating operation of the recorder 14 in particular.

The television recorder may be provided with a user interface of any appropriate form. For instance, FIG. 1 illustrates a remote control device 3 which may be used in conjunction with the display device 6 to enter timer data into the television recorder 2 so as to set a record time in the timer of the controller 18.

Thus, a user is able to enter a record time and, for instance, the channel of a television program in the television recorder. In practice, this may be achieved merely by means of data identifying the television program to be recorded (for instance using an electronic program guide).

According to the time of the required television program, the timer of the controller 18 causes the filter to operate to identify data of the required television program and the recorder 14 to record this onto the storage medium 16.

According to the preferred embodiment, the filter 12 is actually operational at least throughout a predetermined interval before the time set for the start of the television program.

Figure 5:
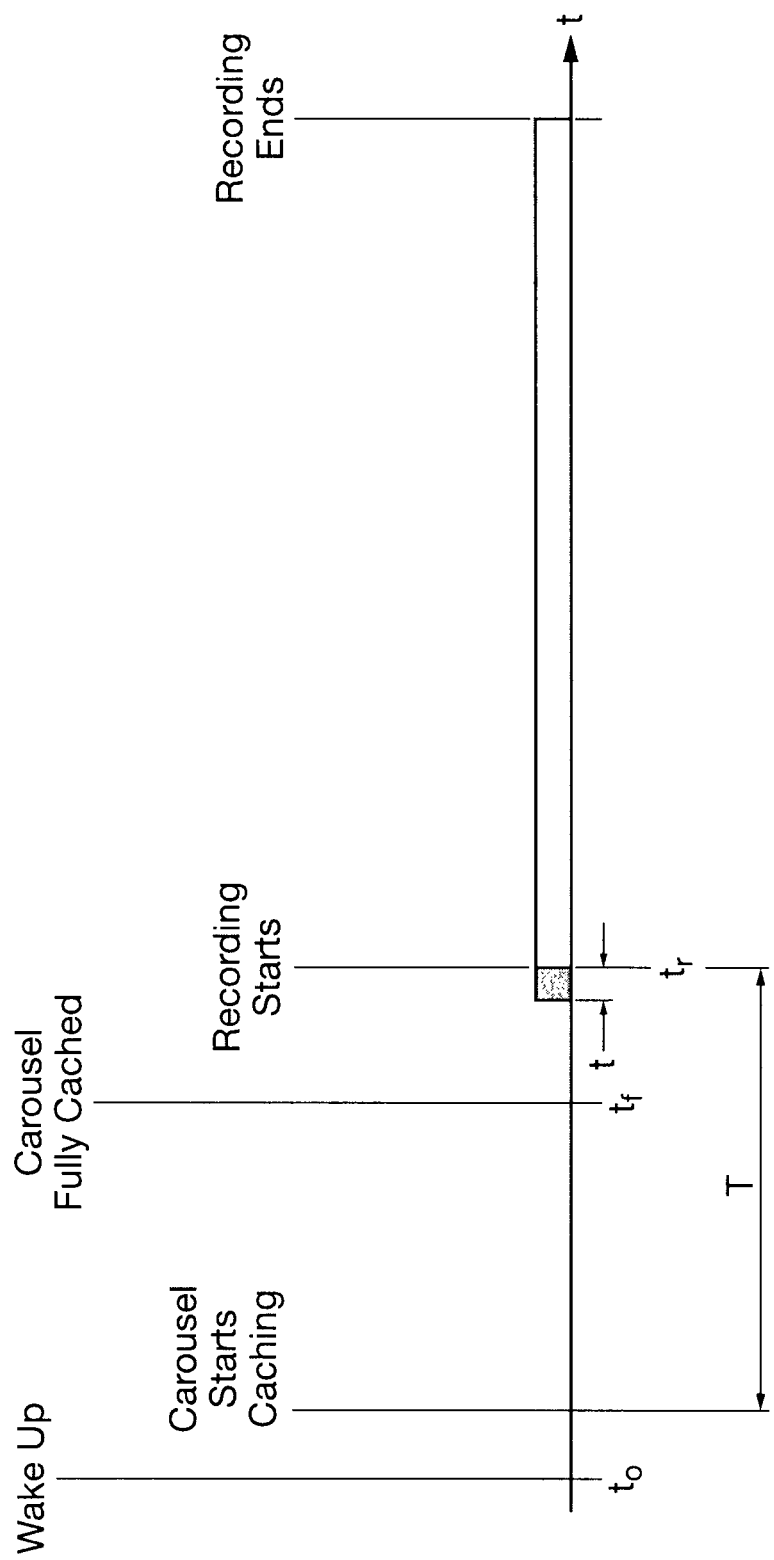
FIG. 5 illustrates an example of timing of recording.

FIG. 5 illustrates schematically the timing of operation of the television recorder whereby the television recorder becomes operational at a time to before the start time for recording the television program $t_r$.

The filter 12 is configured not only to identify and filter data relating to the required television program, but also interactive service data contained in the same transport stream as the television program to be recorded and associated with that television program.

The MPEG PSI (Program Specific Information) contains PAT (Program Association Table) and PMT (Program Map Table) tables (amongst others) for a service/program, these tables contain specific signalling to indicate where the components of the carousel(s) for that service/program exist. The signalling could be done by using databroadcast_id_descriptor and carousel_descriptor, for UK MHEG as an example, but there are other methods for other systems (e.g. MHP) which use additional mechanisms, such as the AIT (Application Information Table).

The identified interactive service data is schematically illustrated as being output from the filter 12 separately and connects with a cache 20.

As illustrated in FIG. 5, the timer of the controller 18 is configured to start storage of the acquired interactive service data in the cache 20 at a predetermined time interval T before the recording time $t_r$.

Interactive data which is provided in the transport stream over time as part of a carousel, for instance conforming to DSM-CC, is gradually acquired and stored in the cache 20. In the timing illustrated in FIG. 5, by a time $t_f$, the carousel of interactive service data has been received in its entirety and fully cached in the cache 20.

At a time period t before the recording start time $t_r$, the controller 18 can cause the cache 20 to transfer its contents to the recorder 14 for recording onto the storage medium 16.

Subsequent to recording start time $t_r$, the recorder 14 merely records the television data extracted by the filter 12 onto the storage medium 16. However, in one preferred embodiment, the recorder 14 also records subsequent interactive service data extracted by the filter 12 and records this in the same stream with the television data on the storage medium 16.

In order to save storage space on the storage medium 16, in one preferred embodiment, the filter 12 may be arranged only to pass on to the recorder 14 new (either completely new or replacement) data, rather than passing on all of the interactive service data, including that previously stored in the cache 20 and recorded in the storage medium 16 prior to the recording start time $t_r$.

In the manner described above, the television recorder is able, prior to the recording start time, to assemble all of the interactive service data in the cache 20. This may then be recorded in a short time at the head of (i.e. immediately before) recording of the television program. Hence, upon playback of the television program recorded in the storage medium 16, a user will have immediately available all of the interactive service data. By allowing the recorder 14 to record the interactive service data then received whilst recording the television program, any updates, changes or additions to the interactive services will be provided to the user at the relevant time during playback of the television program. Indeed, even if the predetermined interval T is not quite sufficient to cache all of the data of the interactive services (for instance the full carousel), it will still greatly reduce the period of playback of information from the storage medium 16 before all of the interactive service data is available to the user.

It is expected that the interactive service data can be transferred from the cache 20 to the recorder 14 and injected into the recording stream onto the storage medium at a very high bit rate. Hence, the duration of the interactive service data before the start of the television program data will be very short and will not interfere significantly with playback of the television program. However, in one embodiment, the controller 18 can be configured to control the recorder 14 to insert a fake entry point or marker in the recording on the storage medium 16. In this way, at the time of playback, the reproducing device will be able to access immediately the start of the audio/video sequence.

Not all interactive services need necessarily be fully contained in a broadcast carousel. In particular, sometimes, an application in the interactive services may refer to other streamed components, for instance from other parts of the transport stream. Where these are not cacheable, it is proposed that they be captured by recording the relevant part of the transport stream.

When an application file containing such a reference is added to the cache 20, steps can be taken to determine that a reference to the stream component has been made. In this respect, the embodiment illustrated in FIG. 4 is provided with a parser 22.

Upon entry into the cache 20, the application component is interpreted in the same way that it would be if being interpreted as part of the interactive application. Thus, for MHEG, the ".mhg" file is parsed by an MHEG ASN.1 parser. The parsing component identifies references within the file (for instance in MHEG UK 1.06 profile, the use of a Content Hook with value "10" could be used) and this could inform the filter 12 and recorder 14 of the stream to be recorded. Thus, in essence, the parser 22 parses data received by the cache 20 and identifies where the interactive service data received by the cache 20 makes reference to another stream within the received transport stream. This is communicated to the filter 12 such that the required additional stream is also provided to the recorder 14 for recording with the main television program on the storage medium 16.

With the resulting data format having the interactive service data at the head of the television program data, it is noted that, upon subsequent editing of the data stored on the storage medium 16, there is a danger that the interactive service data may inadvertently be deleted. In particular, if a user decides to delete the first portion of the television program, the interactive television data stored at the start of that section of data may inadvertently be deleted.

The present invention may provide for a reproduction device, for instance embodied with the recording devices 2, 8 and 10 of FIGS. 1 to 3, which is sensitive to the presence of the interactive service data and is configured to one or both of warn the user that the deletion of the interactive service data is about to take place and prevent the user from deleting the interactive service data, for instance automatically adjusting the edit points for deletion such that deletion starts at the point $t_r$ as illustrated in FIG. 5.

The recorder 14, for instance under the control of controller 18, may be configured additionally to record onto the storage medium 16 content information indicating the presence of the interactive service data immediately prior to the television program data. This content information may be used by any reproduction device so as to be able to carry out the functions mentioned above.

Figure 6:
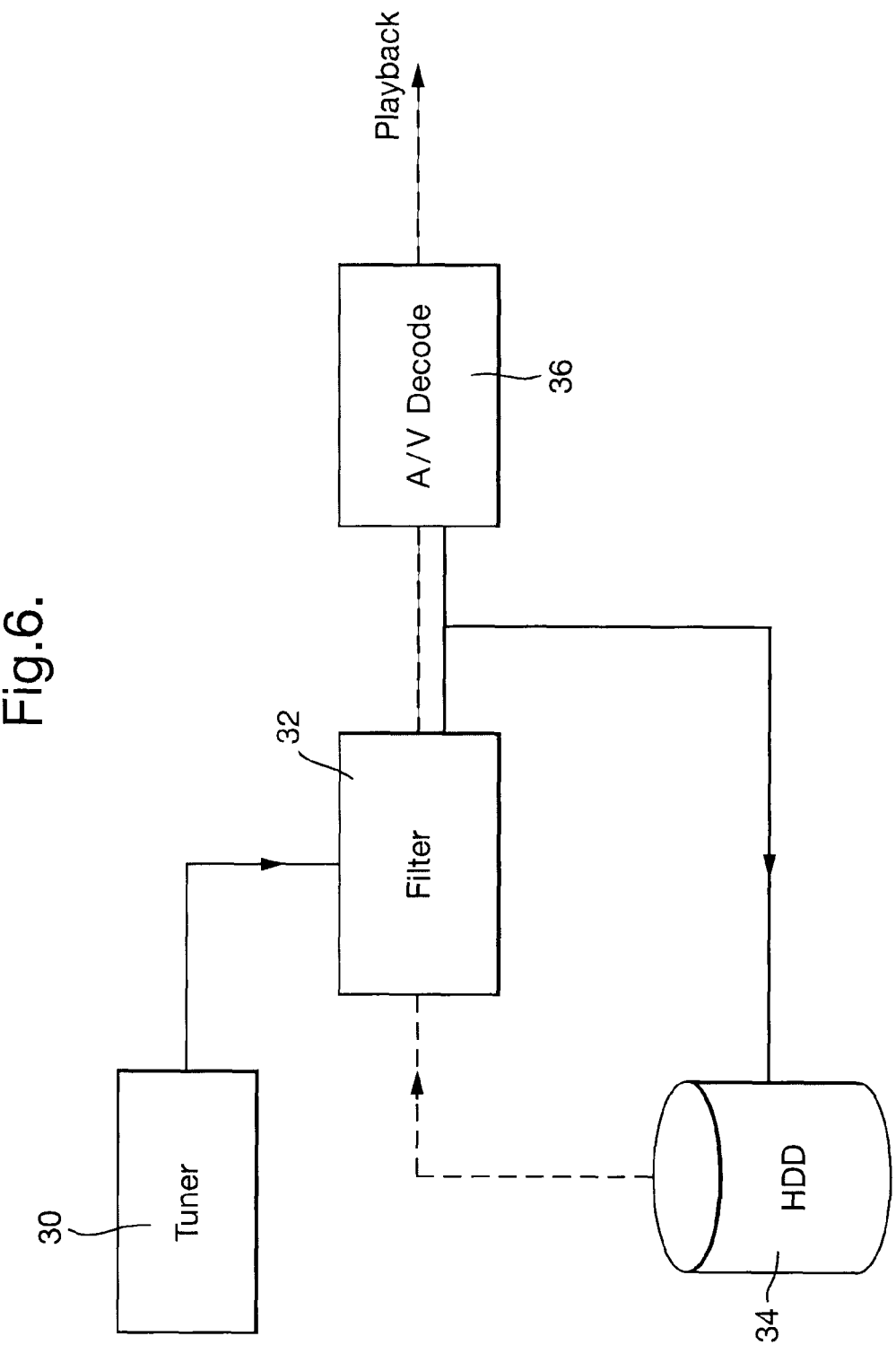

FIG. 6 illustrates schematically an embodiment having both recording and reproduction capability whereas FIG. 7 illustrates only the reproduction/playback functionality.

The system receives broadcast content through a tuner 30, the content is filtered by filter 32 to remove any components (such as from other services or language based components) not required for viewing or recording. The partial TS is then recorded (as a file or files representing the partial TS) into a memory such as HDD 34 or presented to the A/V decoder 36 for viewing as required. During playback from the storage medium 34 the file(s) is fed back to the A/V decoder 36 via the filter 32, though it is unlikely that any filtering is required as it was filtered prior to recording. Hence, alternatively it could be sent directly to the A/V decoder 36 for viewing.

I claim:

1. A digital television recorder for recording television programs including audio/video sequences together with interactive services associated with the television programs and provided in the respective transport streams of those television programs, the recorder including:
   a recording section configured to record data onto a storage medium;
   a filter configured to identify from within a received transport stream, data of a television program for recording;
   a timer configured to be set with a time and, at that time, to start the recording section recording, onto the storage medium, data of the television program received from the filter; and
   a cache configured to store data of the interactive services; wherein
   the filter is configured additionally to identify, from within said received transport stream, data of interactive services associated with said television program;
   the timer is configured additionally, at a predetermined interval before said time, to start acquisition by the filter of said data of interactive services associated with said television program for recording and to start storage of the acquired data of interactive services in said cache; and
   the recording section is additionally configured to record, immediately prior to starting recording the data of the television program, the content of the cache to the storage medium.

2. A digital television recorder according to claim 1, wherein:
the filter is configured to identify interactive services provided as carousels and, during a predetermined interval, at least a substantial part of a carousel is stored in the cache.

3. A digital television recorder according to claim 2, wherein:
the filter is configured to identify interactive services provided in a transport stream inside modules of a DSM-CC object carousel.

4. A digital television recorder according to claim 1, wherein:
the recording section is configured to, after being started by said timer at said time, record onto the storage medium data, received from said filter, of interactive services associated with the television program as well as data, received from said filter, of the television program.

5. A digital television recording according to claim 1, wherein:
the recording section is configured to record onto the storage medium, at said time, a marker signifying the start of the data of the television program.

6. A digital television recorder according to claim 1 further including:
a parser configured to identify, within said data of interactive services associated with the television program, references to supplementary streams of data; wherein
the recording section is configured additionally to record the data of the referenced supplementary streams together with the data of the television program.

7. A digital television recorder according to claim 6, wherein:
the supplementary streams of data include other television programs provided in the transport stream of the television program.

8. A digital television recorder according to claim 1, wherein, as part of recording the content of the cache to the storage medium immediately prior to starting recording the data of the television program, the recording section is configured to start the recording of the content of the cache to the storage medium at a predetermined period before said time.

9. A digital television recorder according to claim 1, wherein, as part of recording the content of the cache to the storage medium immediately prior to starting recording the data of the television program, the recording section is configured to, according to the quantity of data stored in the cache and the recording speed of the recording section recording the content of the cache to the storage medium, start the recording of the content of the cache to the storage medium sufficiently in advance of said time to ensure recording of the entire content of the cache before said time.

10. A digital television recorder according to claim 1, wherein:
the recording section is configured additionally to record onto the storage medium content information indicating the presence of the data of interactive services immediately prior to the data of the television program and for use in one or both of 1) warning a user and 2) preventing deletion of the data of interactive services during an editing operation of the data stored on the storage medium.

11. A digital television recorder according to claim 1, wherein:
the predetermined interval is substantially ten minutes.

12. A method of controlling a digital television recorder for recording television programs including audio/video sequences, together with interactive services associated with the television programs and provided in the respective transport streams of those television programs, the method including:
controlling a recording section of the recorder to record data onto a storage medium;
controlling a filter of the recorder to identify from within a received transport stream data of a television program for recording;
controlling the recording section to start, at a time set to a timer of the recorder, recording, onto the storage medium, data of the television program for recording received from the filter;
controlling the filter to identify, from within the received transport stream, data of interactive services associated with the television program for recording;
controlling, at a predetermined interval before said time, the filter to start acquiring said data of interactive services associated with the television program for recording and a cache of the recorder to store the acquired data of interactive services; and
controlling the recording section to record, immediately prior to starting recording the data of the television program, the content of the cache to the storage medium.

13. A non-transitory computer-readable medium storing computer readable instructions thereon that when executed by a computer cause the computer to perform a method of controlling a digital television recorder for recording television programs including audio/video sequences, together with interactive services associated with the television programs and provided in the respective transport streams of those television programs, comprising:
controlling a recording section of the recorder to record data onto a storage medium;
controlling a filter of the recorder to identify from within a received transport stream data of a television program for recording;
controlling the recording section to start, at a time set to a timer of the recorder, recording, onto the storage medium, data of the television program for recording received from the filter;
controlling the filter to identify, from within the received transport stream, data of interactive services associated with the television program for recording;
controlling, at a predetermined interval before said time, the filter to start acquiring said data of interactive services associated with the television program for recording and a cache of the recorder to store the acquired data of interactive services; and
controlling the recording section to record, immediately prior to starting recording the data of the television program, the content of the cache to the storage medium.

* * * * *